(12) United States Patent
Kay et al.

(10) Patent No.: US 10,795,477 B2
(45) Date of Patent: Oct. 6, 2020

(54) SYSTEM AND METHOD FOR MULTIDIMENSIONAL FLEXIBLE DISPLAY DEVICE INPUT

(71) Applicant: Sharp Kabushiki Kaisha, Osaka (JP)

(72) Inventors: Andrew Kay, Oxford (GB); William Frederick Smith, Oxford (GB); Paul Antony Gass, Oxford (GB); Hywel Hopkin, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 17 days.

(21) Appl. No.: 16/287,021

(22) Filed: Feb. 27, 2019

(65) Prior Publication Data

US 2020/0272266 A1    Aug. 27, 2020

(51) Int. Cl.

| | |
|---|---|
| *G09G 5/00* | (2006.01) |
| *G06F 3/041* | (2006.01) |
| *G06F 1/16* | (2006.01) |
| *G06F 3/0488* | (2013.01) |

(52) U.S. Cl.
CPC .......... *G06F 3/0412* (2013.01); *G06F 1/1652* (2013.01); *G06F 3/0416* (2013.01); *G06F 3/0488* (2013.01); *G09G 2380/02* (2013.01)

(58) Field of Classification Search
CPC ..... G06F 3/03; G06F 1/16; G06F 3/00; G02B 27/01; G09G 3/30; G09G 3/36; G09G 5/00

See application file for complete search history.

(56) References Cited

U.S. PATENT DOCUMENTS

| | | | | |
|---|---|---|---|---|
| 2012/0306910 | A1* | 12/2012 | Kim ....................... | H04N 13/30 345/619 |
| 2017/0018250 | A1* | 1/2017 | Shai ..................... | G06F 1/1684 |
| 2019/0042066 | A1* | 2/2019 | Kim ...................... | G06F 1/1649 |

* cited by examiner

*Primary Examiner* — Pegeman Karimi
(74) *Attorney, Agent, or Firm* — Renner, Otto, Boisselle & Sklar, LLP

(57) ABSTRACT

A flexible electronic device is used to receive user inputs via flex gestures. The electronic device includes a flexible substrate, a shape sensor configured to determine an axis of bending and a degree of flex of the flexible substrate, and a processor coupled to the shape sensor and configured to determine a flex gesture associated with the axis of bending and the degree of flex, wherein the processor updates an output of the electronic device based on the flex gesture. The output includes display information, user interface elements, and a flex gesture input for a device that is coupled to the electronic device. The flex gestures can be assigned to functions such as moving, zooming, scrolling, cropping, rotating, and selection to manipulate content associated with the flexible electronic device.

19 Claims, 11 Drawing Sheets

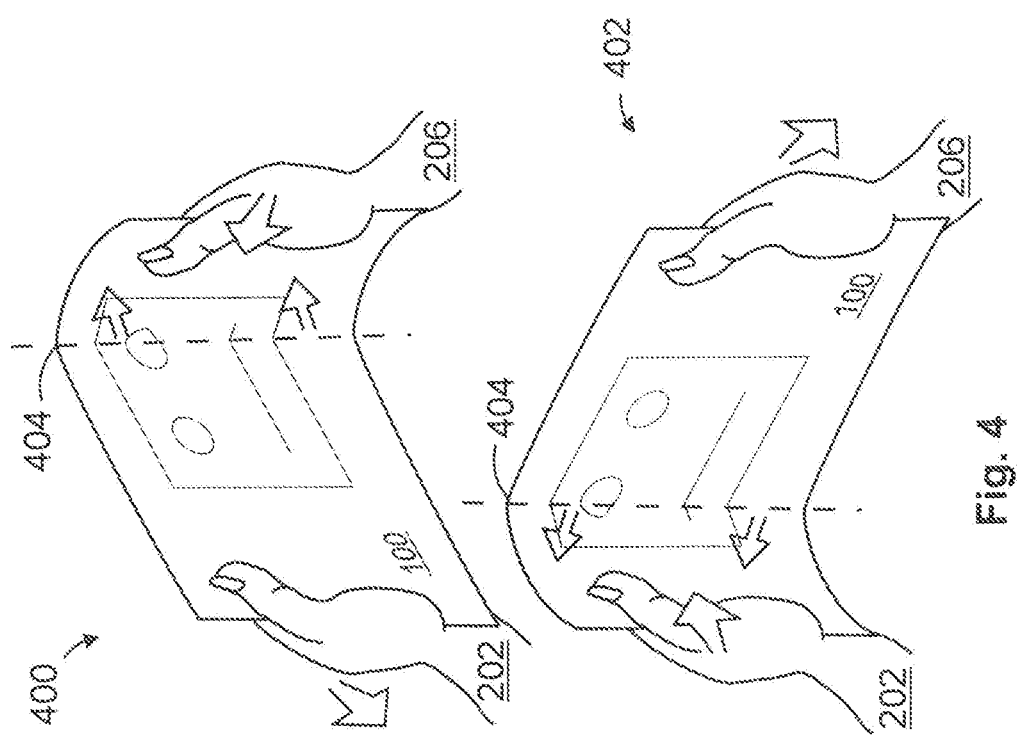

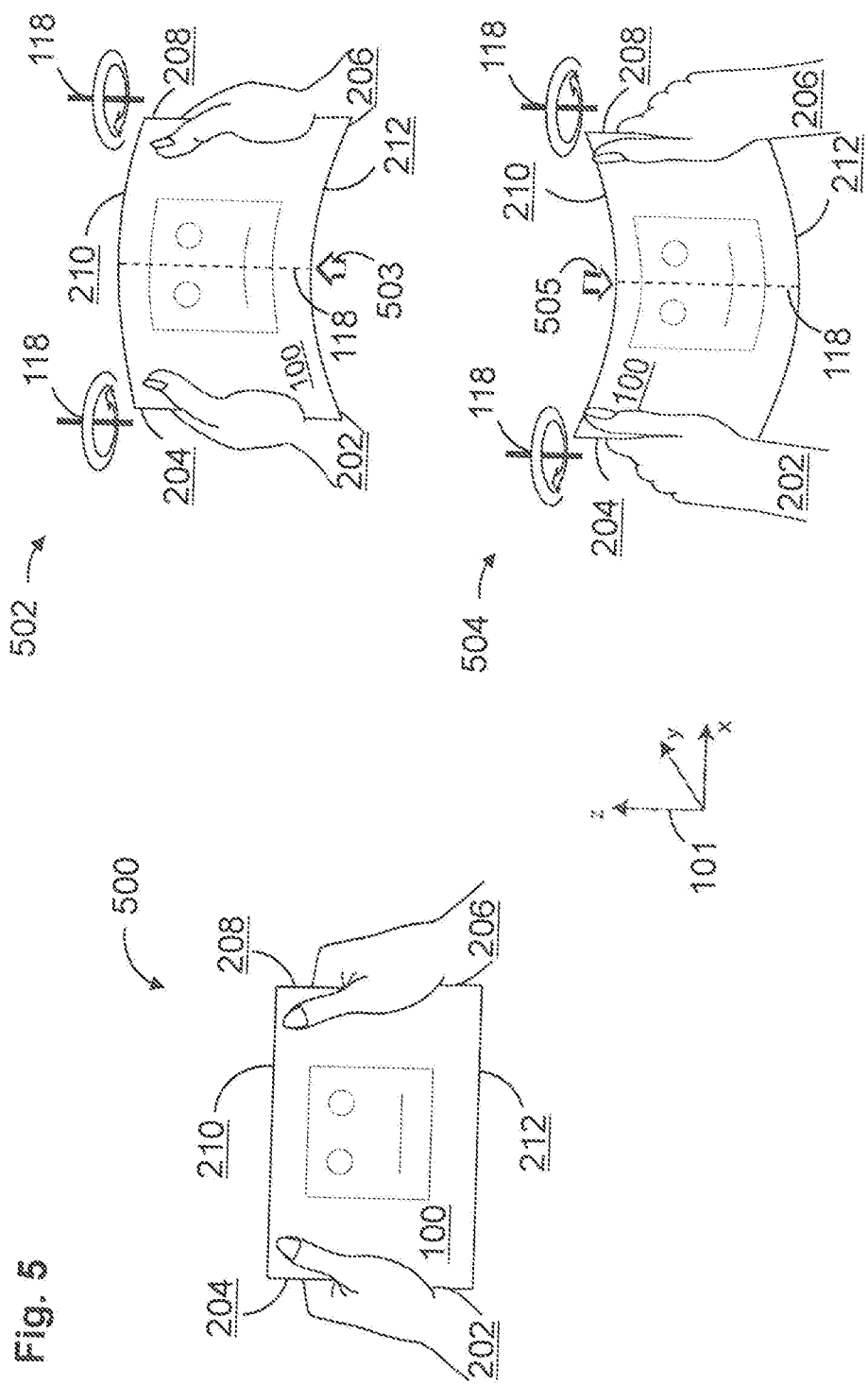

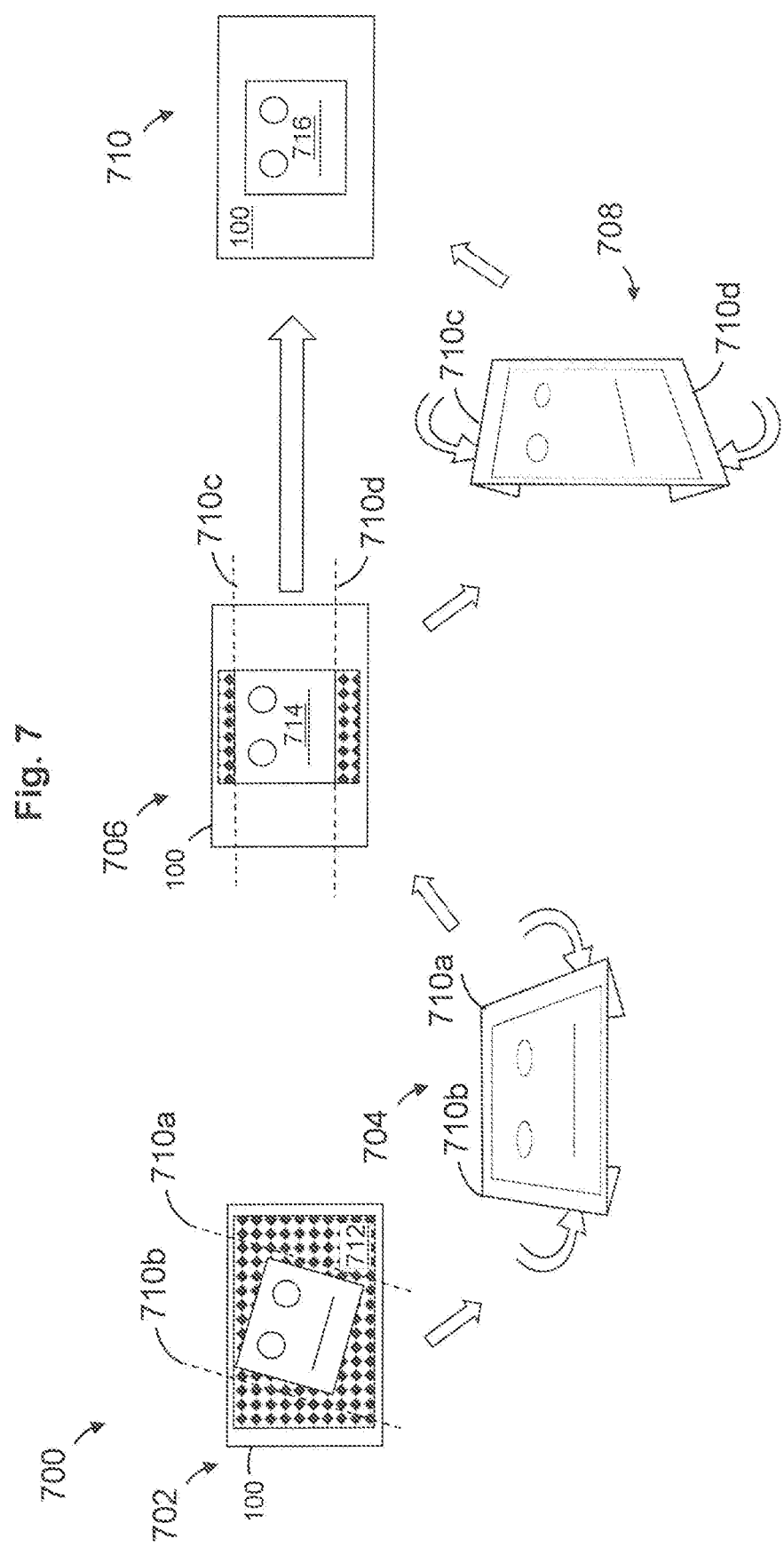

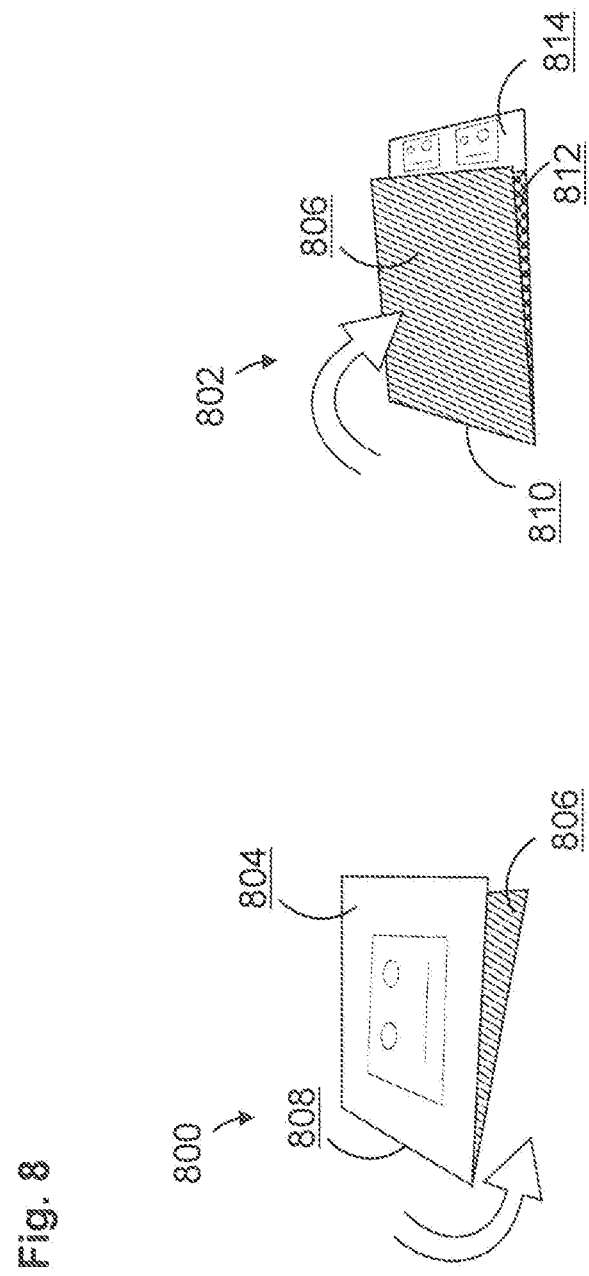

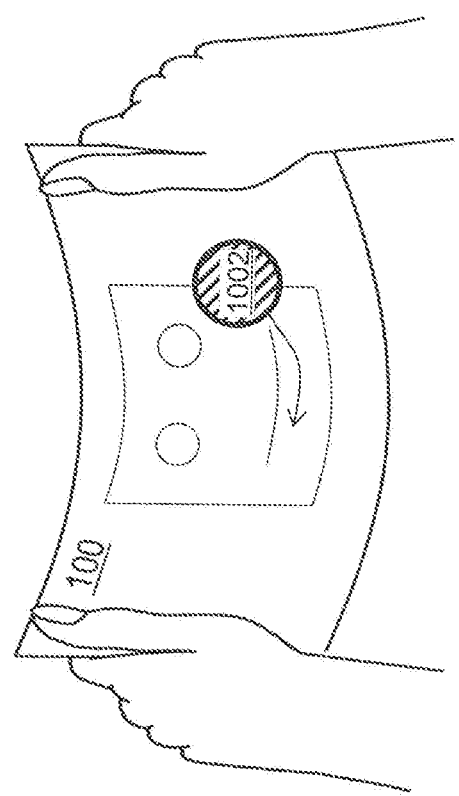
Fig. 10
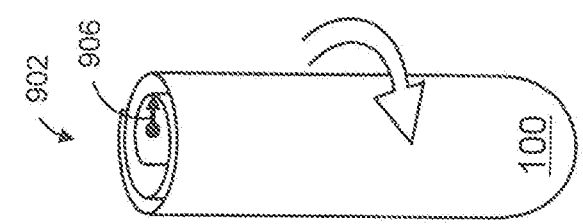
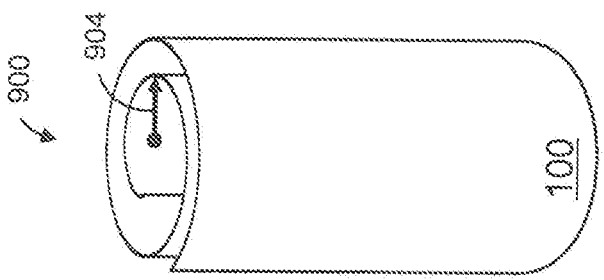
Fig. 9

1200

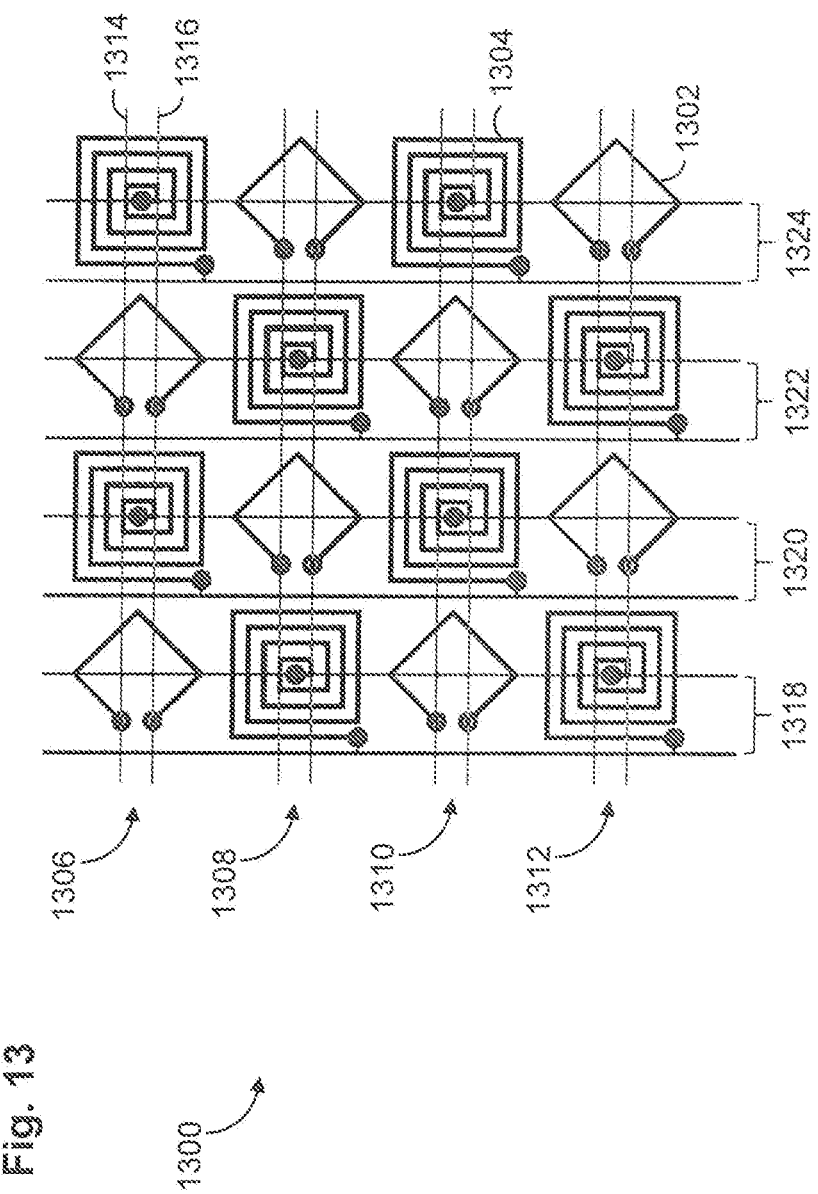

SYSTEM AND METHOD FOR MULTIDIMENSIONAL FLEXIBLE DISPLAY DEVICE INPUT

TECHNICAL FIELD

The present disclosure relates generally to detecting user interactions with a flexible substrate and, more particularly, to systems and methods for determining a user input and providing feedback to a user based on a spatial configuration of the flexible substrate.

BACKGROUND ART

Touch input has become ubiquitous in portable computing devices including mobile phones, gaming systems, and the like. Flexible displays are the next leap in display technology and have been developed with a high degree of substrate flexibility. Currently, deviation of a substrate of a flexible display from a flat plane is used to detect a user input. For example, a flexible display includes a substrate with a fixed axis of bending and deviation of the substrate from the flat plane is used to control areas of the display based on the location of the fixed axis of bending. In another example, a flexible display device may use bend sensors to detect a deviation of the substrate from the flat plane, but a specific axis of bending is not detected resulting in simply a one-dimensional input—whether the device has deviated from the flat plane.

The spatial configuration of a flexible display may be determined using sensors such as piezoelectric sensors, magnetic sensors and the like to detect the current substrate shape. Other conventional flexible displays may position sensors at display hinges, and the sensors are limited to determining the current substrate shape along a single axis associated with the hinge. Such conventional systems, however, do not provide a flexible indication of the current substrate shape. Because of the limited use and capabilities of conventional sensing in a flexible display, control of flexible displays is not being realized to their full potential.

SUMMARY OF INVENTION

Accordingly, there is a need for improved systems and methods of controlling an electronic device through flexing gestures applied to a flexible display. Controlling the device includes detecting user interactions with a flexible substrate based on the spatial configuration of the flexible substrate. The present invention relates to detecting deflection of a flexible substrate in a plurality of directions and determining user inputs associated with the deflection of the flexible substrate. In addition to traditional systems and methods of determining the spatial configuration such as piezoelectric sensors, magnetic sensors, and the like, the spatial configuration may be determined using mutually coupled inductors. A shape sensor using mutually coupled inductors is described in Applicant's commonly assigned U.S. Patent Application, entitled System for Determining Shape of Flexible Display Device (Diego Gallardo Inventor), and filed the same day as the current application, the disclosure of which is hereby incorporated by reference in its entirety for all purposes.

Deflection of a flexible display device with a flexible substrate may be detected while the display device is in use based on changes in the substrate geometry. Any change in the substrate geometry will result in changes to any signals generated by a shape sensor. The signals generated by the shape sensor may be measured to determine whether the substrate has been flexed, bent, warped, folded, and the like. A controller is configured to process one or more of the signals generated by the shape sensor and to determine one or more axes of bending and the spatial configuration of the substrate. The deflection may be processed by an electronic device to implement novel flex gesture software control features such as zoom, scroll, play, crop, rotate, and others.

These novel flex gesture software control features reduce the need for conventional touch inputs so that an electronic device can be controlled without forcing a user to change their grip to move into pointing/touching position; while wearing gloves; without obscuring the display with a finger; and without smudging the display area with touch inputs. Furthermore, flex gesture software control features may improve accessibility of devices for people with limited dexterity. Flex gestures may be combined with other sensors such as accelerometers, gyroscopic sensors, touch sensors, optical sensors and the like for a richer palette of input symbols. While the flex gesture software control features are described by reference to a display device herein, the features may be implemented on any flexible substrate configured to detect spatial configurations.

An aspect of the invention, therefore, is an electronic device, such as a flexible display device, that may be controlled in response to a flexing of the device. The electronic device includes a flexible substrate; a shape sensor configured to determine an axis of bending and a degree of flex of the flexible substrate; and a processor coupled to the shape sensor and configured to determine a flex gesture associated with the axis of bending and the degree of flex, wherein the processor updates an output of the electronic device based on the flex gesture. Another aspect of the invention is a related method performed by the electronic device, and the method may be performed by a processing device that executed program code stored on a non-transitory computer readable medium.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

FIG. 4 is a perspective view of a flexible display device showing an increased degree of flex along an axis of bending in accordance with embodiments of the present invention.

FIG. 5 is a perspective view of one-dimensional flex gestures in accordance with embodiments of the present invention.

FIG. 7 is a perspective view of a series of flex gestures of a foldable flexible display in accordance with embodiments of the present invention.

FIG. 8 is a perspective view of flex gestures of a foldable flexible display in accordance with embodiments of the present invention.

FIG. 9 is a perspective view of a flex gesture of a flexible display in accordance with embodiments of the present invention.

FIG. 10 is a perspective view of a flex gesture of a flexible display controlling a virtual object in accordance with embodiments of the present invention.

FIG. 13 is a schematic drawing depicting shape sensor including a matrix of coils with signal traces in accordance with embodiments of the present invention.

DESCRIPTION OF EMBODIMENTS

Figure 1:
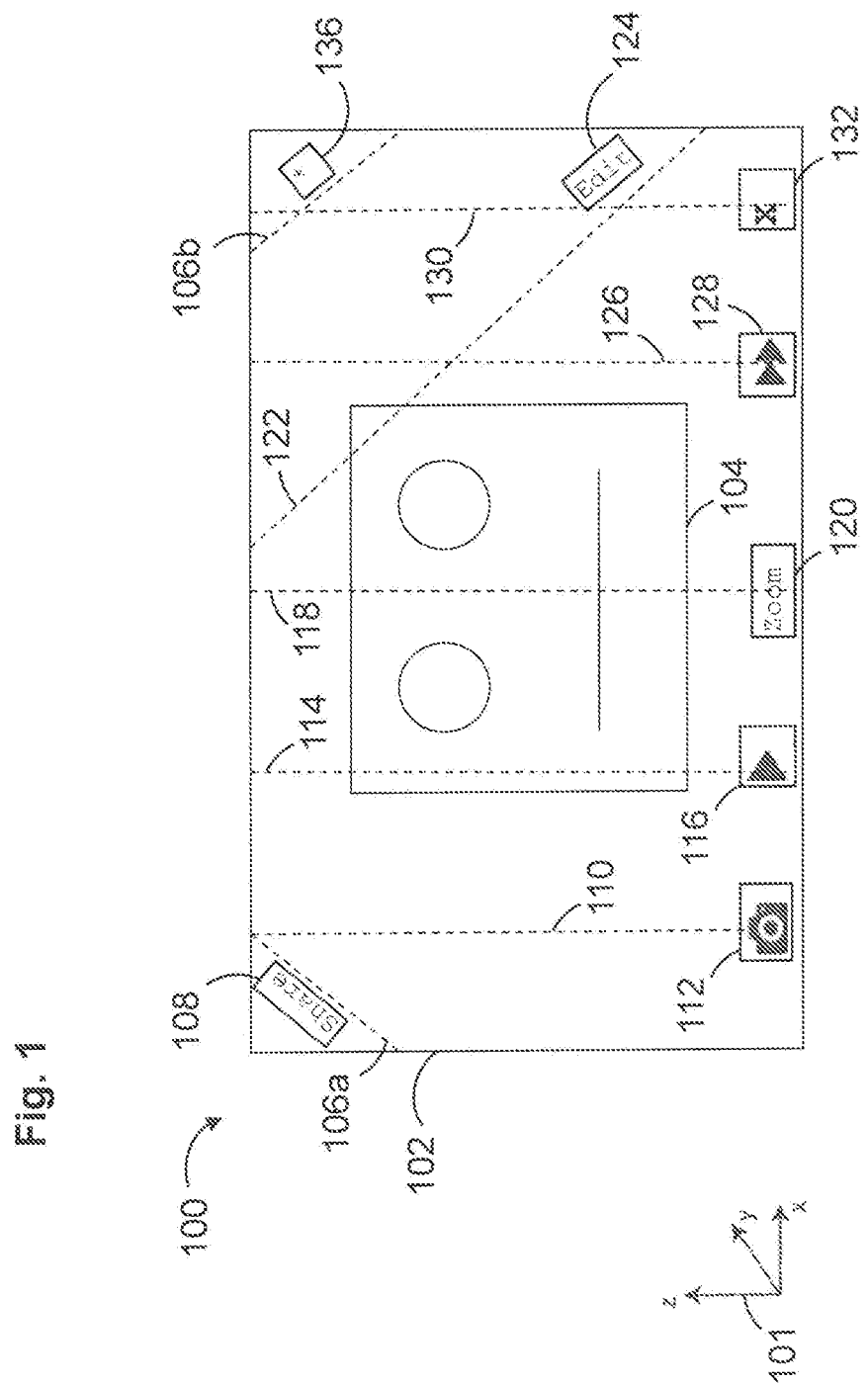
FIG. 1 shows a flexible display device in accordance with embodiments of the present invention.

Embodiments of the present invention will now be described with reference to the drawings, wherein like reference numerals are used to refer to like elements throughout. It will be understood that the figures are not necessarily to scale.

In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

Flex Gestures

For illustrative purposes, FIG. 1 shows a flexible display device 100 in accordance with embodiments of the present invention. The flexible display device 100 may be a portable electronic device such as a phone, a tablet, a hand-held PC, a laptop, or the like. The flexible display device includes a display 102. FIG. 1 shows content 104 that may be manipulated through one or more software control features corresponding to a flex gesture. Flex gestures may be characterized by an axis of bending. The orientation of the flexible display device 100 and the axis of bending will be described in three-dimensional space using XYZ coordinates 101. FIG. 1 illustrates a plurality of axes of bending with dashed lines.

The flexible display device 100 may be configured to flex in a first dimension. For example, the flexible display device 100 may be configured to flex in the z-direction. In this configuration, the flexible display device may detect an axis of bending anywhere along the x-direction of the display 102. The flexible display device 100 may be flexed along a central axis of bending 118 that corresponds to a flex gesture that zooms the content 104 in or out depending on the direction flex at the central axis of bending 118. The central axis of bending 118 may be identified by a zoom label 120 on the display 102. The flexible display 100 may be flexed along a left axis of bending 114 that corresponds to a flex gesture that shifts content 104 on the display 102 in a first direction along the display device. The left axis of bending 114 may be identified by a direction label 116. The flexible display device 100 may be flexed along a right axis of bending 126 that corresponds to a flex gesture that shifts content 104 on the display far in a second direction along the display device. The right axis of bending 126 may be identified by a second direction label 128. The flexible display device 100 may be flexed along a far-left axis of bending 110 that corresponds to a flex gesture that causes the flexible display device 100 to open an application related to the content 104 on the display 102. Accordingly, an application label 112 may identify the far-left axis of bending 110. For example, if the content 104 is a photo, the far-left axis of bending 110 may correspond to a camera application and the application label 112 may display a camera icon. The flexible display device 100 may be flexed along a far-right axis of bending 130 corresponding to a flex gesture that causes the flexible display device 100 to close the application associated with the content 104 on the display 102. The far-right axis of bending may be identified by a quit application label 132.

The flexible display device 100 further may be configured to flex in more than one dimension. Additional flex gestures may be included in the software control features of a display device configured to flex in more than one dimension. For example, FIG. 1 shows dog ear axes of bending 106 at the corners of display 102. A first dog ear axis of bending 106a may be configured to share content 104 on the display 102. The first dog ear axis of bending 106a may be identified by a share label 108. A second dog ear axis of bending 106b may be configured to mark/unmark content 104 on the display 102 as a favorite. The second dog ear axis of bending 106b may be identified by a favorite label 136. The flexible display device 100 may be flexed along a diagonal axis of bending 122 corresponding to a specific application function. For example, if content 104 is an image, the diagonal axis of bending 122 may be associated with an edit function of a photo application. Accordingly, a function label 124 may include text that indicates the diagonal axis of bending 122 is associated with editing the content 104.

Although specific actions have been discussed in association with the different axes of bending shown in FIG. 1, any suitable combinations of bending axes and control commands may be employed. In addition, the axes of bending to issue display commands may be provided at any suitable locations, and along any suitable axes, across the display device. Actions may be selected based on a corresponding motion used to manipulate a physical object. For example, the dog-ear axes of bending 106 may be used to turn pages when reading an e-book. Accordingly, the examples described herein are non-limiting examples. In addition, a given axis of bending may combined with different control commands depending upon the application being used or content being displayed at different times.

The flexible display device 100 may show the axes of bending associated with flex gestures on the display 102 at various times, such as when starting an application as a mnemonic for a user along with the flex gesture labels, or upon the user beginning to flex the display device. The flex gesture labels may include icons or text summaries of their function.

To further assist a user with flex gesture controls, the flexible display device 100 may include a training mode. The training mode may display the flex gesture labels and axes of bending to a user to facilitate the user's understanding of the possible flex gesture inputs for an application. The flexible display device 100 and/or a specific application may track the experience of one or more users with a flex gesture enabled device and disable flex gesture labels for an experienced user.

Degree of Flex

Figure 2:
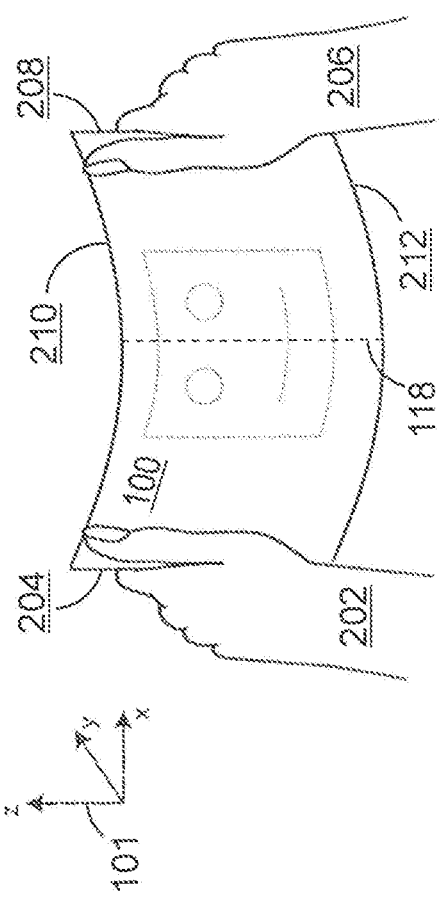
FIG. 2 is a perspective view of a flex gesture on a flexible display device in accordance with embodiments of the present invention.

FIG. 2 is a perspective view of a flex gesture on a flexible display device in accordance with embodiments of the present invention. In addition to the axis of bending, a flex gesture may be characterized by the degree to which the display is flexed along one or more axes of bending. A left hand 202 of the user may grip a left edge 204 of the flexible display device 100. A right hand 206 of the user may grip a right edge 208 of the flexible display device 100. The user may exert a force that causes the flexible display device 100 to flex around the central axis of bending 118. The flex is illustrated by the curve shown along the top edge 210 and bottom edge 212 of the flexible display device 100. The degree of flex may be characterized by a radius of curvature associated with the axis of bending.

Figure 3:
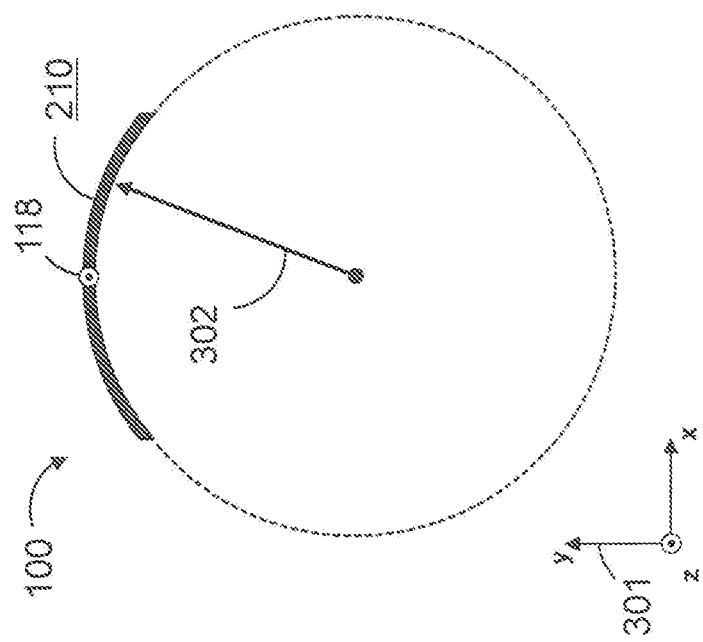
FIG. 3 is plan view of a flexible display device showing a radius of curvature in accordance with embodiments of the present invention.

FIG. 3 is plan view of the flexible display device 100 showing a radius of curvature in accordance with embodiments of the present invention. The flexible display device 100 is shown in a top-down position with the top edge 210 facing out of the page. The radius of curvature 302 may be expressed by a unit of length such as millimeters (mm). The radius of curvature 302 of the flexible display device 100 may be characterized by a minimum value that defines shape at which the flexible display device 100 may not be flexed past for use. The flexible display device 100 may be configured to determine the spatial configuration associated with an axis of bending as a percentage of the minimum radius of curvature. For example, if the flexible display device 100 was in a flat plane, the degree of flex may be 0%. And, if the flexible display device 100 was flexed around an axis of bending to the minimum radius of curvature, the degree of flex may be 100%. The degree of flex may be assigned a negative or positive sign to indicate a direction of flex from a planar spatial configuration.

FIG. 4 is a perspective view of a flexible display device showing an increased degree of flex along an axis of bending in accordance with embodiments of the present invention. FIG. 4 includes a first flex gesture 400 and a second flex gesture 402. The first flex gesture 400 is associated with the left hand 202 of the user and the right hand 206 of the user manipulating the flexible display device 100 to cause an axis of bending 404 with an increased degree of flex to shift toward the right hand 206 of the user. The increased degree of flex may be associated with the minimum radius of bending, i.e. max curvature of the flexible display device 100. The position of the axis of bending 404 may be determined using the point of greatest degree of flex along one or more axes of the display device 100. The first flex gesture 400 may be used to move an object on the display toward the right hand 206 of a user.

The second flex gesture 402 is associated with the user manipulating the flexible display device to cause the axis of bending 404 with an increased degree of flex to shift toward the left hand 202 of the user. The second flex gesture 402 may be used to move an object on the display toward the left hand 202 of a user.

For example, an application executing on the flexible display device 100 may assign cursor movement to the first and second flex gestures. Accordingly, in response to the first flex gesture 400, the application may move a cursor to the right on the display and in response to the second flex gesture 402, the application may move the cursor to the left on the display. The cursor may be used to select an image in a photo application, to select text in a reading and/or word processing application, to select a link or other item from a horizontal list, and other application in which selections are made. The flexible display device may be configured to determine an amount of time the axis of bending 404 is in a position relative to content on the display. The flexible display device may be configured to determine whether the amount of time is equal to or greater than a threshold value associated with manipulating the content on the display, for example, selecting an object on the display.

The flexible display device 100 may set the content on the display using the axis of bending 404. For example, the display device may partition the display into two areas and display a first application in a first partition and a second application in a second partition.

Although the axis of bending 404 with an increased degree of flex is shown along the vertical direction, some flexible display devices may flex in multiple dimensions. Accordingly, both the position and angle of an axis of bending with an increased degree of flex can be used to characterize a flex gesture. The angle of an axis of bending may be defined as the angle formed by the axis of bending and a side of the flexible display device. A flex gesture characterized by an axis of bending defined by both position and angle may be used, for example, to control an object in a game.

Direction of Flex

FIG. 5 is a perspective view of one-dimensional flex gestures in accordance with embodiments of the present invention. FIG. 5 shows the flexible display device 100 in three spatial configurations to illustrate how a direction of flex associated with flex gestures may be used to manipulate content 104 on the display 102. The first spatial configuration 500 of the flexible display device 100 is a flat plane. The second spatial configuration 502 of the flexible display device 100 is characterized by the central axis of bending 118 being displaced in a first direction of flex 503 toward a user and parallel to the negative direction of the y-axis. To characterize the first direction of flex 503, the flexible display device 100 may assign a positive or negative sign to the degree of flex based on the direction of flex. For example, because the first direction of flex 503 is parallel to the negative direction of the y-axis in the XYZ coordinates 101, the degree of flex associated with the second spatial configuration 502 may be negative, e.g., −50%. The third spatial configuration 504 of the flexible display device 100 is characterized by the central axis of bending 118 being displaced in a second direction of flex 505 away from the user and parallel to the positive direction of the y-axis. To characterize the second direction flex 505, the flexible display device 100 may assign a different sign to the degree of flex. For example, because the second direction of flex 505 is parallel to the positive direction of the y-axis in the XYZ coordinates 101 the degree of flex associated with the third spatial configuration 504 may be negative, e.g., −50%.

The first spatial configuration 500 may be associated with an initial state of the flexible display device. Accordingly, the second spatial configuration 502 and the third spatial configuration 504 may be interpreted by the flexible display device 100 as two different flex gestures. An application may assign any meaning to a flex gesture detected by the flexible display device 100. For example, the second spatial configuration 502 may be associated with a "zoom in" flex gesture and the third spatial configuration 503 may be associated with a "zoom out" flex gesture by applications for browsing/taking photographs and reading text. In another example, the second spatial configuration 502 and the third spatial configuration 503 may be associated with acceleration/deceleration in a driving game. In another example, the second spatial configuration 502 and the third spatial configuration 503 may be associated with louder/softer volume in a media playback application. In another example, the second spatial configuration 502 and the third spatial configuration 503 may be associated with a fast forward/fast reverse in a media playback application. Other commands may be defined and employed as are suitable for any particular application.

The flexible display device 100 may be configured to track the time that an axis of bending is flexed from the first spatial configuration 500 as another input associated with a flex gesture. A user may quickly bend the display device to the second spatial configuration 502 and/or to the third spatial configuration 503 and return the flexible display device 100 to the first spatial configuration 500. The flexible display device may track one or more of a duration and a degree of flex when the display is flexed from the first spatial configuration 500, and compare one or more of the duration and the degree of flex to threshold values associated with an action. The duration may be compared to a threshold duration and the flexible display device may detect a flex gesture if the duration is above or below the threshold depending on the application. The degree of flex may be compared to a threshold degree of flex and the flexible display device may detect a flex gesture if the degree of flex is above or below the threshold depending on the application. Comparison of the duration and the degree of flex to their respective threshold values may be combined to detect a flex gesture. For example, a file sharing application may be associated with a "flick" flex gesture and send a file to another device. The "flick" flex gesture may be detected if the duration of an associated flex gesture is below a threshold duration value and the degree of flex is greater than a threshold degree of flex value for the assigned file-share function. In another example, a screen-casting application may transfer display functionality to another device if the duration of a flex gesture is below a threshold value associated with a "flick" flex gesture assigned to the screen-casting function.

In addition to direction of flex of the central axis of bending 118, some flexible display devices may be flexed on one or more additional axes such as a horizontal and/or a diagonal axis of bending as discussed above with respect to FIG. 1. The direction of flex associated with the horizontal and/or the diagonal axis may also be assigned any meaning by an application executing on the flexible display device 100. For example, a diagonal axis of bending may choose a direction for a game character to move or perform and action. In embodiments in which a diagonal axis of bending, such as axis of bending 122 in FIG. 1, is used to choose a direction for a game character to move, flexing the diagonal axis of bending 122 in the positive y-axis direction may cause the character to turn toward the left hand 202 of the user and displacement of the axis of bending 122 in the negative direction of the y-axis may cause the character to turn toward the right hand 206 of the user.

Furthermore, the display device 100 may detect direction of flex along multiple axes. The detection of simultaneous flex along multiple axes of bending may be used for simultaneous effects associated with individual flex gestures and/or one unique flex gesture associated with the multiple axes of bending. An application may assign any meaning to a flex gesture associated with multiple axes of bending. Using the earlier example of a driving game, if both the central axis of bending 118 and the diagonal axis of bending 122 are flexed in the first direction of flex 503, i.e. toward the user, the car may decelerate and turn to the left.

Rotation

Figure 6:
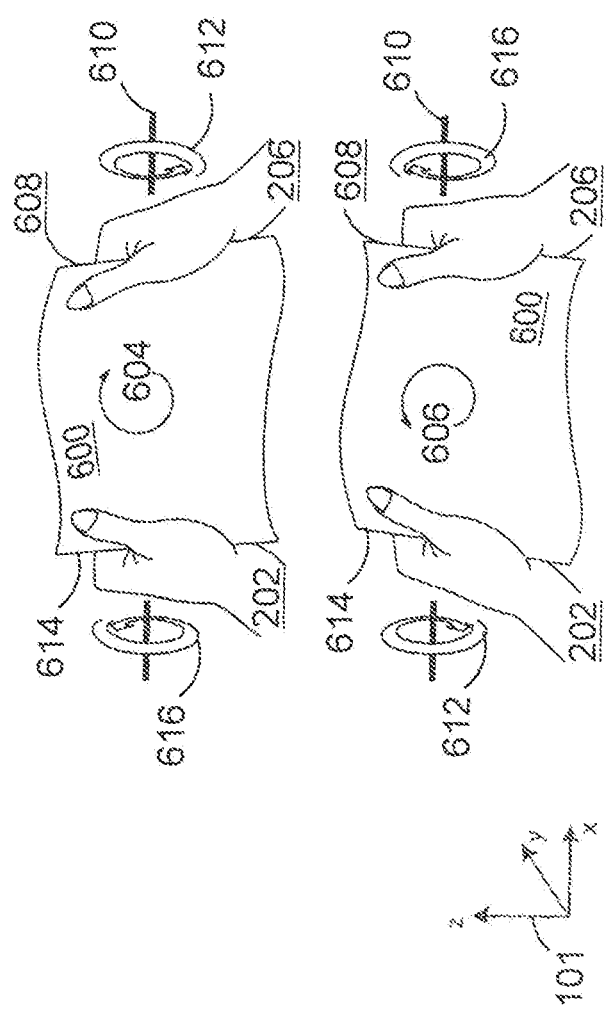
FIG. 6 is a perspective view of multi-dimensional flex gestures in accordance with embodiments of the present invention.

FIG. 6 is a perspective view of multi-dimensional flex gestures in accordance with embodiments of the present invention. A flexible display device 600 is also a stretchable display device. Twist flex gestures stretch the surface of the flexible display device 600 because the hands of the user are rotated in opposite directions resulting in the twist. A magnitude of twist may be used to control an amount of action. To detect a twist right 604, the flexible display device 600 may determine a right edge 608 of the flexible display device 600 is being rotated around an axis of rotation 610 in a first direction 612, and a left edge 614 of the flexible display device 600 is being rotated around the axis of rotation 610 in a second direction 616. To detect a twist left 606, the flexible display device 600 may determine the right edge 608 is being rotated around the axis of rotation in the second direction 616, and the left edge 614 is being rotated around the axis of rotation 610 in the first direction 612.

The twist right 604 and the twist left 606 flex gestures may be assigned to various actions. For example, the twist flex gestures may be assigned by an application to control rotation of content on the flexible display device 600. The amount of twist may be used to control the speed and/or amount of rotation of content. In a driving game, for example, the twist gestures may be assigned to steering controls. The amount of twist may be used to control the turning radius in the driving game.

Although described using a stretchable display, twist flex gestures may be implemented on a rigid display device using force sensors to detect torque without any actual rotation. Furthermore, the dog-ear axes described above with respect to FIG. 1 may be flexed in opposite directions for the desired twist direction on a non-stretchable display.

Folding

FIG. 7 is a perspective view of a series 700 of flex gestures of a foldable flexible display in accordance with embodiments of the present invention. The series 700 shows the flexible display device 100 in an initial planar state 702, a folded state 704, a second planar state 706, a second folded state 708, and a final planar state 710. A fold axis may be distinguished from an axis of bending by the radius of curvature. For example, if the degree of flex is 100%, the flexible display device may determine the flex gesture is associated with a fold axis. A flex gesture associated with a fold axis may be assigned to any action by an application.

For example, an application may use one or more flex gestures to crop an image. In the initial planar state 702, the flexible display device 100 may display content to a user that includes an image 712. The application may provide the user the functionality to crop areas of the image along one or more fold lines 710. The user may fold the display device 100 along a right fold line 710a and a left fold line 710b to crop right and left areas of the image 712 respectively. The folded state 704 shows the display device 100 with a right portion of the display device 100 folded along the right fold line 710a and a left portion of the display device 100 folded along the left fold line 710b. The second planar state 706 shows a second image 714 derived from the first image 712 with a portion of the background removed. The application may be configured adjust the rotation of a cropped image in one step by rotating the image so that "up" is parallel to the fold lines.

To remove the remaining background portions of the second image 714, the user may fold the display device 100 a second time along a top fold line 710c and a bottom fold line 710d to crop top and bottom areas of the second image 714. The second folded state 708 shows the display device with a top portion of the display device 100 folded along the top fold line 710c and a bottom portion of the display device 100 folded along the bottom fold line 710d. The final planar state 710 shows the display device 100 with a fully cropped image 716 derived from the first image 712 with all background portions removed.

To crop an image using a flexible display device that can flex in one dimension, the image may still be cropped using two folding steps. First, the image 712 may be cropped using left and right folds. Next, the remaining portions of an image may be removed by rotating the display device 100 about a horizontal axis causing the application to rotate the orientation of the second image 714. In the new position, the user may fold the display along the top and bottom fold lines to remove the remaining background portions of the second image 714.

FIG. 8 is a perspective view of flex gestures of a foldable flexible display in accordance with embodiments of the present invention. The flexible display device 100 may be folded into a double-sided mode 800 and/or a low-power mode 802. The flexible display device 100 may include a display surface 804 and a back surface 806. In the double-sided mode 800, the flexible display device 100 may detect a flex gesture associated with the user folding the flexible display device 100 along a fold 808 so that the display surface 804 is divided into two portions, both portions being visible to the user but on opposing sides of the device relative to fold 808. A photo application on the flexible display device may detect the flex gesture associated with the double sided-mode 800 to use the flexible display device 100 to show the same image on both sides so that the user can take a photo and the subject of the photo can see the image to help with posing.

In the low-power mode 802, the flexible display device 100 may detect a flex gesture associated with the user folding the device along a fold 810 so that a first portion display surface faces a second portion 812 of the display surface. The first portion of the display surface and the second portion 812 of the display surface may be inactivated by the flexible display device to reduce power consumption. The low-power mode 802 may include a third portion 814 of the display surface that is a reduced active area that can display image content. Because the third portion 814 is small relative to the inactive portions, power consumption is reduced. The reduced active area also may be used to display sensitive information in a smaller area, increasing the privacy of the data on the display. Furthermore, both the low-power mode 802 and the double-sided mode 800 result in a smaller form factor that may provide improved handling for applications associated with each flex gesture.

Complex Gestures

FIG. 9 is a perspective view of a flex gesture of a flexible display in accordance with embodiments of the present invention. The flexible display device 100 may detect one or more flex gestures associated with a rolled state of the device. FIG. 9 shows a first rolled state 900 and a second rolled state 902. The first rolled state 900 may be characterized by a first degree of flex based on a first radius of curvature 904, and the second rolled state 902 may be characterized by a second degree of flex based on a second radius of curvature 906. The first radius of curvature 904 may be associated with a neutral rolled state. The second radius of curvature 906 may result from a force applied by a user. The flex gestures associated with the rolled state may be assigned any meaning by an application.

For example, a media application may continue to play music when the flexible display device is in a rolled state. A flex gesture that reduces the radius of curvature from the first radius of curvature 904 to the second radius of curvature 906 may be assigned to a volume control that lowers the volume of the music. A second flex gesture may increase the radius of curvature and be associated with a volume control that increases the volume of the music.

Additionally, a rolled flexible display device may be coupled to another device and used as an input control. As well as the flex gestures, other sensors in the flexible display device 10,0 such as accelerometers, gyroscopic sensors, touch sensors, optical sensors and the like may provide additional inputs to control another device.

FIG. 10 is a perspective view of a flex gesture of a flexible display controlling a virtual object in accordance with embodiments of the present invention. The flexible display device 100 may combine one or more flex gestures described herein to control the movement of a virtual object 1002. The flex gestures may be combined with other sensors such as accelerometers, gyroscopic sensors, touch sensors, optical sensors and the like for a richer palette of additional inputs to control the movement of the virtual object 1002 on the flexible display device 100. The flex gestures and additional inputs may be used by an application such as a maze application to properly determine the direction of travel of the virtual object 1002, such as mapping curvature to gravity so that the virtual object 1002 runs down slope.

The flex gestures described herein may be used to enhance user experience of a variety of applications. One of ordinary skill in the art would recognize many variations, modifications, and alternatives.

System Diagram

Figure 11:
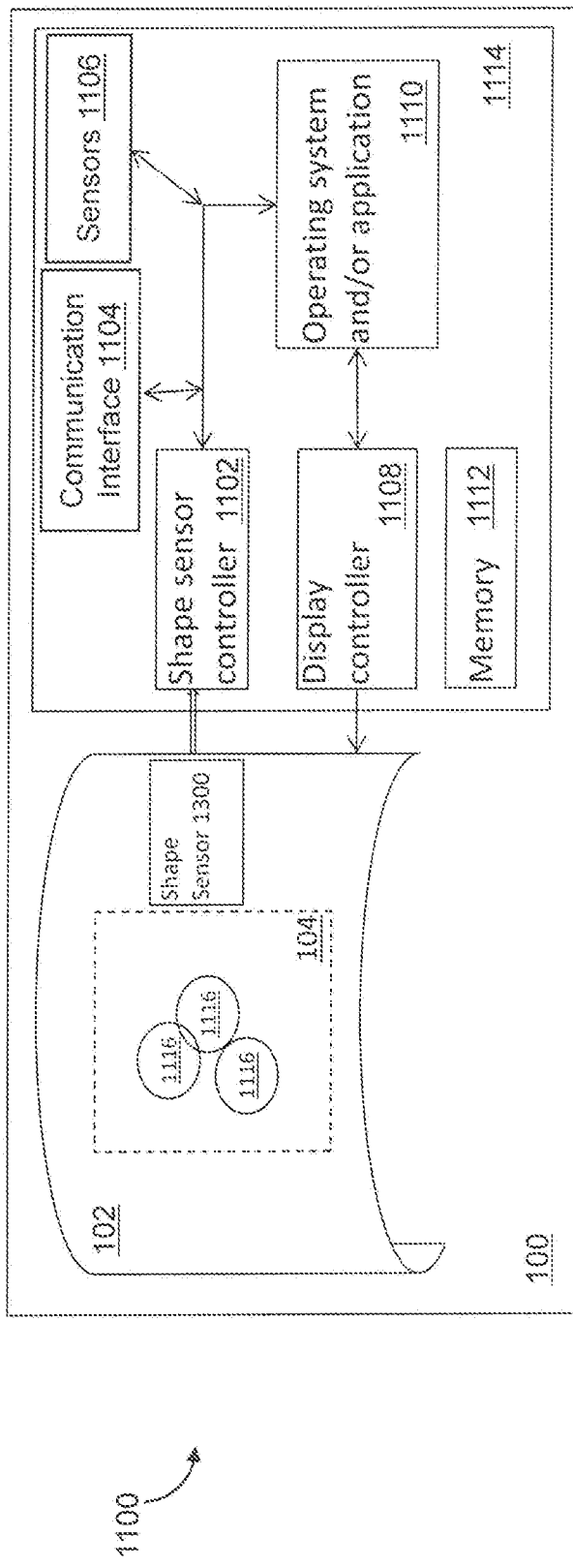
FIG. 11 is a schematic block diagram of a flexible display in accordance with embodiments of the present invention.

FIG. 11 is a schematic block diagram 1100 of a flexible display device 100 in accordance with embodiments of the present invention. The flexible display device may include a flexible display 102 with a shape sensor 1300 (see FIG. 13 for an example shape sensor configuration), a shape sensor controller 1102, a communications interface 1104, additional sensors 1106, a display controller 1108, an operating system and/or application module 1110, and a memory 1112. The flexible display 102 may be an organic light emitting diode display or similar flexible display formed on a flexible substrate. The flexible display 102 may be a touch sensitive display configured to detect touch inputs in addition to flex gesture inputs. The shape sensor may be coupled to the flexible display to provide data associated with one or more measurements to the shape sensor controller 1102 so that a spatial configuration of the flexible display 102 may be determined. The shape sensor may include piezoelectric sensors, magnetic sensors, mutually coupled inductors, and the like.

The shape sensor controller 1102 and/or the operating system 1110 may process the data from the shape sensor to determine the spatial configuration and detect one or more axes of bending and a radius of curvature associated with each of the one or more axes of bending. After determining the one or more axes of bending, the operating system and/or application module 1110 may identify a flex gesture based on the one or more axes of bending and the radius of curvature associated with each of the one or more axes of bending. The operating system and/or application module 1110 may receive additional data from the sensors 1106. The sensors 1106 may include one or more of accelerometers, gyroscopic sensors, touch sensors, optical sensors and the like. The flex gesture and additional data may be processed by the operating system and/or application module 1110 to update an output associated with the operating system and/or the application. The outputs may include at least one or more of the content 104 including display information on display 102, one or more user interface elements 1116, and a flex gesture input for a second device that is transmitted via the communication interface 1104. The user interface elements 1116 may be a cursor, an object on the display such as a ball in a maze game, objects of an image rendered by the display controller 1108, and the like.

The flexible display device 100 may be a phone, tablet, handheld personal computer, laptop, or the like. As will be understood by one of ordinary skill in the art, one or more of the shape sensor controller 1102, the communications interface 1106, the additional sensors 1106, the display controller 1108, the operating system and/or application module 1110 may have various implementations. For example, they may be implemented as part of any suitable computing or processing device, such as a processor (e.g., CPU), programmable circuit, an integrated circuit, a memory and I/O circuits, an application specific integrated circuit, microcontroller, a complex programmable logic device, other programmable circuits, or the like. The memory 1112 may also include a non-transitory computer readable medium, such as random-access memory (RAM), a read-only memory (ROM), an erasable programmable read-only memory (EPROM or Flash memory), or any other suitable medium. Instructions for performing the steps described herein may be stored in the non-transitory computer readable medium and executed by the processor. The processor may be communicatively coupled to the memory 1112 and a communication interface 1106 through a system bus, mother board, or using any other suitable structure known in the art.

Figure 12:
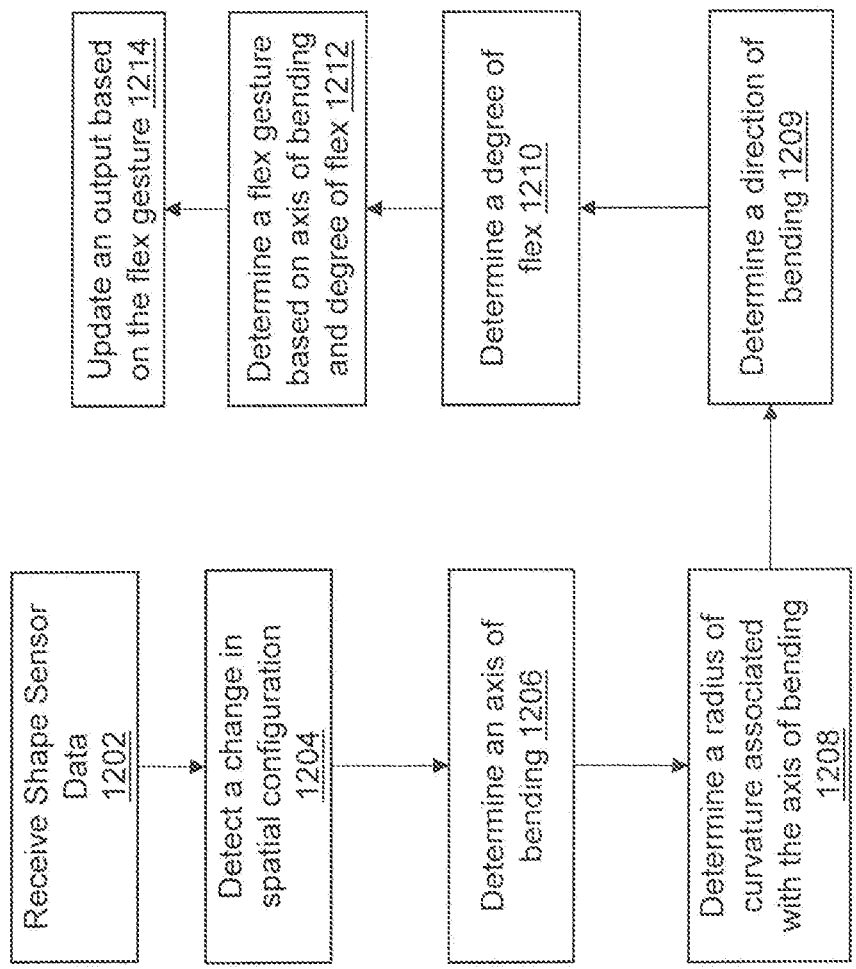
FIG. 12 is a flow diagram of the steps to determine a flex gesture and update of a display in accordance with embodiments of the present invention.

FIG. 12 is a flow diagram of the steps to determine a flex gesture and update a display in accordance with embodiments of the present invention. One or more processors may perform part or all of the steps disclosed herein. At step 1202, a processor may receive shape sensor data. The shape sensor data may be received from one or more shape sensors coupled to a flexible substrate. The flexible substrate may be coupled to a flexible display. The shape sensors may include piezoelectric sensors, magnetic sensors, mutual inductance sensors, and the like. At step 1204, the processor may process the shape sensor data to detect a change in a spatial configuration associated with the flexible substrate. The processor may store a current spatial configuration in memory to detect future or progressive changes.

At step 1206, the processor may determine an axis of bending based on the spatial configuration. The processor may detect more than one axis of bending depending on the configuration of the flexible substrate and the shape sensor output. The processor may determine an angle associated with the axis of bending based on an angle formed between the axis of bending and an edge of the flexible display device. At step 1208, the processor may determine a radius of curvature associated with the axis of bending. At step 1209, the processor may determine a direction of bending based on the spatial configuration. The direction of bending may be characterized by the direction the axis of bending moves from its position when the spatial configuration is a flat plane. At step 1210, the processor may determine a degree of flex by comparing the radius of curvature to a minimum radius of curvature and assign a sign to the degree of flex based on the direction of bending. At step 1212, the axis of bending and the degree of flex may be used to determine a flex gesture. The flex gesture and a fold gesture may be distinguished by the degree of flex. At step 1214, the processor may update an output based on the flex gesture. The output may include at least one or more of display information, user interface elements, and flex gesture inputs for a second device that is transmitted via a communication interface.

It should be appreciated that the specific steps illustrated in FIG. 12 provide a particular method of detecting a flex gesture and updating an output according to an embodiment of the present invention. Other sequences of steps may also be performed according to alternative embodiments. Moreover, the individual steps illustrated in FIG. 12 may include multiple substeps that may be performed in various sequences as appropriate to the individual step. Furthermore, additional steps may be added or existing steps may be removed depending on the particular applications. One of ordinary skill in the art would recognize many variations, modifications, and alternatives.

Any suitable shape sensor may be incorporated as part of the flexible display 102 to detect the configuration of the flexible substrate. As referenced above, a shape sensor using mutually coupled inductors is described in Applicant's commonly assigned U.S. Patent Application, entitled System for Determining Shape of Flexible Display Device (Diego Gallardo Inventor), and filed the same day as the current application, the disclosure of which is hereby incorporated by reference in its entirety for all purposes. Such shape sensor is based on mutually coupled inductors. The amount of mutual inductance that links one coil to another depends on the relative positioning of the two coils.

A flexible display device 102 may include a matrix of mutually coupled inductors formed on a flexible substrate to detect a current spatial configuration of the substrate. A flexible 2-dimensional (2D) matrix of coils may be coupled through a plurality of mutual inductance coefficients. Each of the plurality of mutual inductance coefficients may be shape dependent, and changes in the substrate geometry may cause changes in the mutual inductances between coils of the 2D matrix of coils. Any change in the mutual inductance will result in changes to any induced signals in the 2D matrix of coils. In various embodiments, induced signals in the 2D matrix of coils may be measured to determine whether the substrate has been flexed, bent, warped, folded, and the like. In some embodiments, the 2D matrix of coils may be coupled to a controller that is configured to measure one or more induced signals and determine one or more mutual inductances, and the spatial configuration of the substrate is based on at least one or more of the induced signals and the mutual inductances.

In exemplary embodiments, the shape sensor may include a matrix of coils with a first subset of coils and a second subset of coils; and a controller coupled to the matrix of coils, wherein the controller is configured to generate and transmit an excitation signal to the first subset of coils and measure, on the second subset of coils, an induced signal, and wherein, the controller is configured to determine a spatial configuration of the second subset of coils relative to the first subset of coils based on the induced signal. The shape sensor may be incorporated into a flexible display system so as to determine the degree or state of flexing of the flexible display system.

For example, as also described in the referenced related application, FIG. 13 is a schematic drawing depicting a shape sensor 1300 of a matrix of coils with signal traces in accordance with embodiments of the present invention. The shaper sensor matrix 1300 of coils may include a first subset of coils 1302 characterized by a diamond geometry and a second subset of coils 1304 characterized by a spiral geometry. Each coil includes two terminals. The matrix 1300 may be coupled to a controller by one or more addressing lines. The addressing lines may include one or more signal traces. For a series arrangement, a signal trace may be used to couple the terminals of the coils in a row or column to the controller in series. In a parallel arrangement, a pair for signal traces may be used to couple the coils to the controller in parallel.

For example, matrix 1300 includes a first horizontal addressing line 1306, a second horizontal addressing line 1308, a third horizontal addressing line 1310, and a fourth horizontal addressing line 1312. The coils in the matrix 1300 are coupled to the controller in parallel, so each addressing line includes a first signal trace 1314 and a second signal trace 1316. The horizontal addressing lines may be coupled to the terminals of the first subset of coils 1302 characterized by the diamond geometry. The matrix 1300 also includes a first vertical addressing line 1318, a second vertical addressing line 1320, a third vertical addressing line 1322, and a fourth vertical addressing line 1324. The vertical addressing lines may be coupled to the terminals of the second subset of coils 1304 characterized by the spiral geometry. The horizontal addressing lines may be coupled to a driver, a sensing circuit, or a controller configured to both transmit a drive signal and measure an induced signal. Like the horizontal addressing lines, the vertical addressing lines may be coupled to a driver, a sensing circuit, or a controller configured to transmit a drive signal and measure an induced signal.

Additional examples and details of shape sensors based on mutually coupled inductors are described in the referenced related application.

An aspect of the invention therefore is an electronic device that includes a flexible substrate, a shape sensor configured to determine an axis of bending and a degree of flex of the flexible substrate, and a processor coupled to the shape sensor and configured to determine a flex gesture associated with the axis of bending and the degree of flex, wherein the processor updates an output of the electronic device based on the flex gesture. The electronic device may include one or more of the following features, either individually or in combination.

In exemplary embodiments of the electronic device, the axis of bending is characterized by an angle formed between the axis of bending and a side of the flexible substrate and a position along the side of the flexible substrate.

In exemplary embodiments of the electronic device, the degree of flex is characterized by at least one or more of a radius of curvature and a direction of bending.

In exemplary embodiments of the electronic device, the output of the electronic device includes at least one of display information, a user interface element, and a flex gesture input for a second device that is coupled to the electronic device.

In exemplary embodiments of the electronic device, the electronic device includes a display coupled to the flexible substrate In exemplary embodiments of the electronic device, a flex gesture causes the processor to output display information associated with zooming content on a display.

In exemplary embodiments of the electronic device, a flex gesture causes the processor to output display information associated with scrolling content on a display.

In exemplary embodiments of the electronic device, a flex gesture is associated with a twist and causes the processor to output display information associated with rotating content on a display.

In exemplary embodiments of the electronic device, a flex gesture is assigned an action by an application configured to execute on the processor.

In exemplary embodiments of the electronic device, a flex gesture is associated with a fold and wherein the processor disables a portion of a display based on the axis of bending associated with the flex gesture.

In exemplary embodiments of the electronic device, a flex gesture is associated with a fold and wherein the processor crops a portion of an image based on the axis of bending associated with the flex gesture.

Another aspect of the invention is a method of operating a flexible display device including receiving shape sensor data, detecting a spatial configuration of a flexible substrate based on the shape sensor data, determining an axis of bending associated with the spatial configuration, determining a degree of flex associated with the axis of bending, determining a flex gesture associated with the axis of bending and the degree of flex, and transmitting an update to a display controller based on the flex gesture. The method may include one or more of the following features, either individually or in combination.

In exemplary embodiments of the method, the axis of bending is characterized by an angle formed between the axis of bending and a side of the flexible substrate and a position along the side of the flexible substrate.

In exemplary embodiments of the method, the degree of flex is characterized by at least one or more of a radius of curvature and a direction of bending.

In exemplary embodiments of the method, the method of operating the flexible display device further includes transmitting data to a second device in response to the flex gesture In exemplary embodiments of the method, the method of operating the flexible display device further includes assigning a user interface element to the flex gesture; and updating the user interface element in response to the flex gesture.

In exemplary embodiments of the method, an update transmitted to the display controller based on the flex gesture causes the display controller to zoom content on a display coupled to the display controller.

In exemplary embodiments of the method, an update transmitted to the display controller based on the flex gesture causes the display controller to scroll content on a display coupled to the display controller.

In exemplary embodiments of the method, the method of operating the flexible display device further includes determining the axis of bending is associated with a fold gesture based on the degree of flex.

Another aspect of the invention is a non-transitory computer readable medium storing computer program code including instructions that, when executed by one or more processors, cause the one or more processors to receive shape sensor data, detect a spatial configuration of a flexible substrate based on the shape sensor data, determine an axis of bending associated with the spatial configuration, determine a degree of flex associated with the axis of bending, determine a flex gesture associated with the axis of bending and the degree of flex, and transmit an update to a display controller based on the flex gesture.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

INDUSTRIAL APPLICABILITY

Embodiments of the present invention relate to configuration and operation of devices with a flexible substrate in which flex gestures may be used to interact with a device. Examples of such devices include mobile phones including smartphones, personal digital assistants (PDAs), tablets, laptop computers, public information displays, industrial controls, and the like.

REFERENCE SIGNS LIST

100—flexible display device
101—coordinates
102—display
104—content
106—dog ear axes of bending
106a—first dog ear axis of bending
106b—second dog ear axis of bending
108—share label
110—far-left axis of bending
112—application label
114—left axis of bending
116—direction label
118—central axis of bending
120—zoom label
122—diagonal axis of bending
124—function label
126—right axis of bending
128—second direction label
130—far-right axis of bending
132—quit application label
136—favorite label
202—left hand
204—left edge
206—right hand
208—right edge
210—top edge
212—bottom edge
302—radius of curvature
400—first flex gesture
402—second flex gesture
404—axis of bending
500—first spatial configuration
502—second spatial configuration
503—first direction of flex
504—third spatial configuration
505—second direction of flex
600—flexible display device
604—twist right
606—twist left
608—right edge
610—axis of rotation
612—first direction
614—left edge
616—second direction
700—series of flex gestures
702—initial planar state
704—folded state
706—second planar state
708—second folded state
710—final planar state
710a—right fold line
710b—left fold line
710c—top fold line
710d—bottom fold line
712—initial image
714—second image
716—cropped image
800—double-sided mode
802—low-power mode
804—display surface
806—back surface
808—fold
810—fold
812—second portion
814—third portion
900—first rolled state
902—second rolled state
904—first radius curvature
906—second radius curvature
1002—virtual object
1100—schematic block diagram
1102—shape sensor controller
1104—communications interface
1106—additional sensors
1108—display controller
1110—operating system and/or application module
1112—memory
1116—user interface elements
1202—receive step
1204—detect step
1206—determine axis step
1208—determine radius step
1209—determining direction
1210—determine degree step
1212—determine flex gesture step
1214—update output step
1300—shape sensor
1302—first subset of coils
1304—second subset of coils
1306—first horizontal addressing line
1308—second horizontal addressing line
1310—third horizontal addressing line
1312—fourth horizontal addressing line
1314—first signal trace
1316—second signal trace
1318—first vertical addressing line
1320—second vertical addressing line
1322—third vertical addressing line
1324—fourth vertical addressing line

The invention claimed is:
1. An electronic device comprising:
a flexible substrate;
a shape sensor configured to determine an axis of bending and a degree of flex of the flexible substrate; and
a processor coupled to the shape sensor and configured to determine a flex gesture associated with the axis of bending and the degree of flex, wherein the processor updates an output of the electronic device based on the flex gesture;

wherein the processor further is configured to detect a flex gesture associated with folding the flexible substrate along a fold whereby a first portion of the flexible substrate faces a second portion of the flexible substrate, and the first portion and the second portion respectively include first and second display surfaces that are rendered inactive areas, and a third portion of the flexible substrate includes a third display surface that is rendered an active area that displays image content.

2. The electronic device of claim 1 wherein the axis of bending is characterized by an angle formed between the axis of bending and a side of the flexible substrate and a position along the side of the flexible substrate.

3. The electronic device of claim 1, wherein the degree of flex is characterized by at least one of a radius of curvature and a direction of bending.

4. The electronic device of claim 1, wherein the degree of flex is characterized as positive or negative depending upon a direction of flex relative to an axis of bending.

5. The electronic device of claim 1 wherein the output of the electronic device includes at least one of display information, a user interface element, and a flex gesture input for a second device that is coupled to the electronic device.

6. The electronic device of claim 1 further comprising a display coupled to the flexible substrate.

7. The electronic device of claim 1 wherein the flex gesture causes the processor to output display information associated with zooming content on a display.

8. The electronic device of claim 1 wherein the flex gesture causes the processor to output display information associated with scrolling content on a display.

9. The electronic device of claim 1 wherein the flex gesture is associated with a twist and causes the processor to output display information associated with rotating content on a display.

10. The electronic device of claim 1 wherein the flex gesture is assigned an action by an application configured to execute on the processor.

11. A method of operating a flexible display device comprising:
 receiving shape sensor data;
 detecting a spatial configuration of a flexible substrate based on the shape sensor data;
 determining an axis of bending associated with the spatial configuration;
 determining a degree of flex associated with the axis of bending;
 determining a flex gesture associated with the axis of bending and the degree of flex; and
 transmitting an update to a display controller based on the flex gesture;
 the method further comprising detecting a flex gesture associated with folding the flexible substrate along a fold whereby a first portion of the flexible substrate faces a second portion of the flexible substrate, and the first portion and the second portion respectively include first and second display surfaces that are rendered inactive areas, and a third portion of the flexible substrate includes a third display surface that is rendered an active area that displays image content.

12. The method of operating a flexible display device of claim 11 wherein the axis of bending is characterized by an angle formed between the axis of bending and a side of the flexible substrate and a position along the side of the flexible substrate.

13. The method of operating a flexible display device of claim 11 wherein the degree of flex is characterized by at least one or more of a radius of curvature and a direction of bending.

14. The method of operating a flexible display device of claim 11 further comprising transmitting data to a second device in response to the flex gesture.

15. The method of operating a flexible display device of claim 11 further comprising:
 assigning a user interface element to the flex gesture; and
 updating the user interface element in response to the flex gesture.

16. The method of operating a flexible display device of claim 11 wherein the update transmitted to the display controller based on the flex gesture causes the display controller to zoom content on a display coupled to the display controller.

17. The method of operating a flexible display device of claim 11 wherein the update transmitted to the display controller based on the flex gesture causes the display controller to scroll content on a display coupled to the display controller.

18. The method of operating a flexible display device of claim 11 further comprising determining the axis of bending is associated with a fold gesture based on the degree of flex.

19. A non-transitory computer readable medium storing computer program code including instructions that, when executed by one or more processors, cause the one or more processors to:
 receive shape sensor data;
 detect a spatial configuration of a flexible substrate based on the shape sensor data;
 determine an axis of bending associated with the spatial configuration;
 determine a degree of flex associated with the axis of bending;
 determine a flex gesture associated with the axis of bending and the degree of flex;
 transmit an update to a display controller based on the flex gesture; and
 detect a flex gesture associated with folding the flexible substrate along a fold whereby a first portion of the flexible substrate faces a second portion of the flexible substrate, and the first portion and the second portion respectively include first and second display surfaces that are rendered inactive areas, and a third portion of the flexible substrate includes a third display surface that is rendered an active area that displays image content.

* * * * *